May 28, 1963
J. P. FOX
3,091,375
VISCOUS LIQUID APPLICATORS
Original Filed Nov. 20, 1959
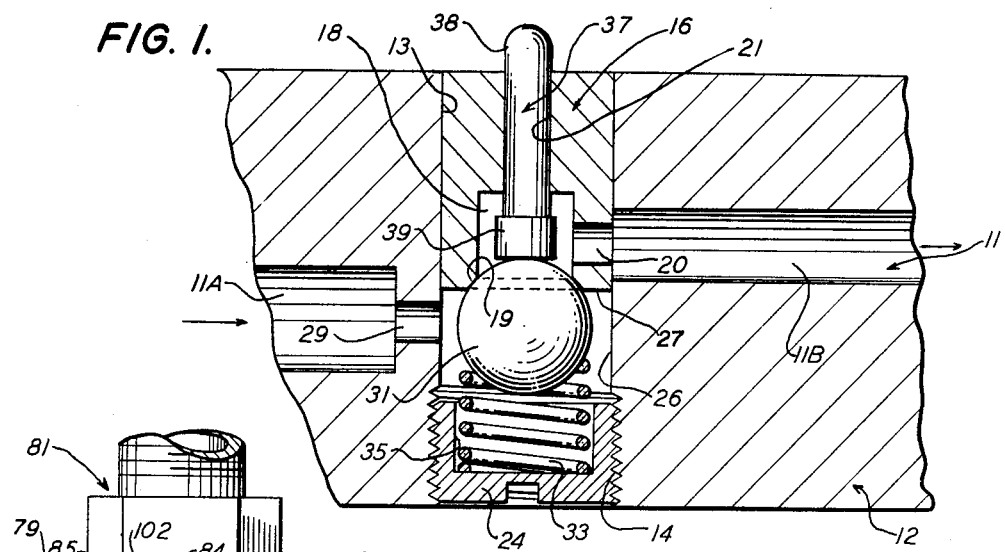
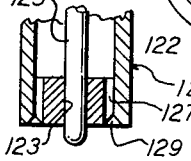
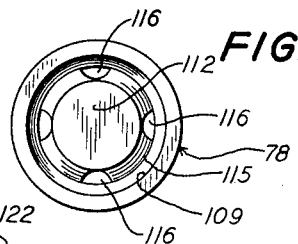
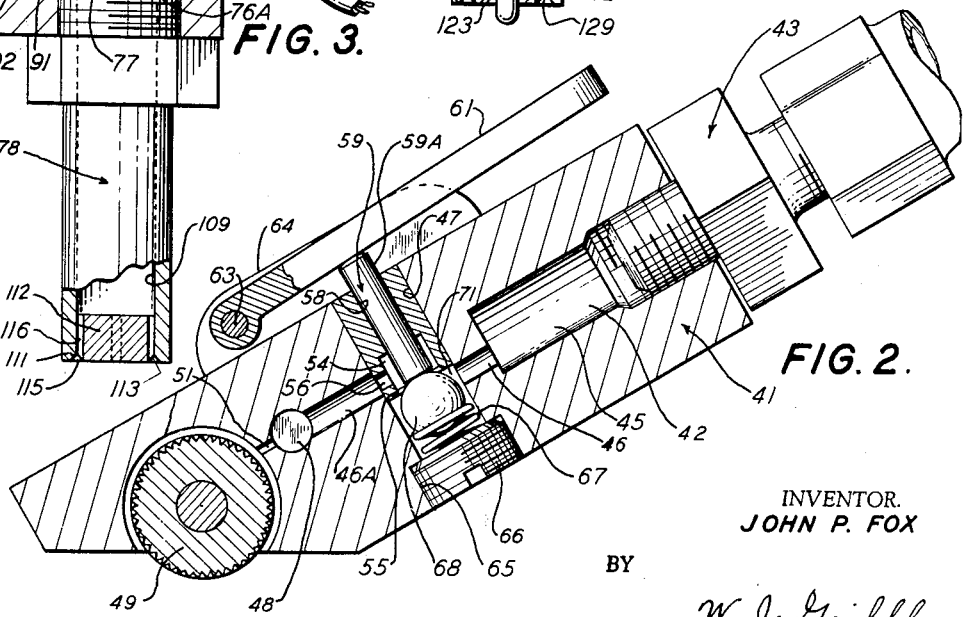
INVENTOR.
JOHN P. FOX
BY
W. J. Gribble
ATTORNEY

United States Patent Office 3,091,375
Patented May 28, 1963

3,091,375
VISCOUS LIQUID APPLICATORS
John P. Fox, Arcadia, Calif., assignor to The Aro Corporation, Bryan, Ohio, an Ohio corporation
Original application Nov. 20, 1959, Ser. No. 854,310. Divided and this application Oct. 31, 1960, Ser. No. 66,165
3 Claims. (Cl. 222—479)

The invention relates to ball valves and more particularly to such valves capable of insertion into flow lines for relatively viscous liquids.

The application is a division of applicant's parent application Serial No. 854,310 filed November 20, 1959 and entitled "Loaded Ball Line Valve."

One of the remaining problems in the highly refined art of liquid flow control is that of precise control of liquids with viscosities in the range of syrups and liquid glues of commercial varieties. Proper control and application of glues, for instance, has been the subject of much recent labor. Such work is exemplified by parents for glue guns to Robert C. Warren, Number 2,694,211 and 2,877,480 issuing November 16, 1954 and March 17, 1959, respectively. The inventive apparatus of these patents went a long way toward providing glue guns which would not drip glue when the glue dispenser was moved from workpiece to workpiece. In opening and closing the valves of such devices, the conventional dispensing unit for viscous liquids depends upon a pressure head to force the liquid through the dispensing unit. The velocities of the flowing liquids impose varied biasing loads upon the valving parts. Therefore it is difficult to maintain constant valve response. This is particularly true when the valving mechanism must move in the same direction as the line of liquid flow. I have invented a valving apparatus which may be used to control the flow of many different liquids. The inventive valving apparatus solves the present difficulties cited above and is simple to fabricate. It is easy to place in position in the line and uses a relatively small space in the liquid flow system compared to conventional devices of comparable capacity.

The invention contemplates apparatus including a ball valve insertable in a liquid flow line which comprises an insert element having a chamber, a valve seat, and a port for the chamber connecting to the flow line, in addition to a valve ball movable into closing contact with the valve seat. Resilient means load the valve ball into closed position against the valve seat. Means operable to urge the valve ball from the valve seat are also included in the contemplation of the invention. In a preferred form the invention may be embodied in a gun for dispensing viscous liquids which has a housing, means for supplying liquid to the housing, a dispensing outlet, and a flow channel communicating between the inlet and the outlet. The inventive apparatus comprises in combination a valve insert element interposed in the gun housing across the flow channel, a first chamber, a second chamber, and a valve seat, all disposed coaxially in the gun housing, preferably at right angles to the channel therein. A first port opening from the channel into the first chamber and a second port in the valve insert opening from the channel into the second chamber, open into the respective chambers at points adjacent the plane of closure of the valve seat. A valve ball is movable in the first chamber against the valve seat. Means are provided which are operable exteriorly of the valve insert element to move the ball away from the valve seat to permit the liquid to flow through the valve. A compression spring imposes a valve closing force on the valve ball and a chamber cap which is removable from the exterior of the gun housing gives access to the chambers and valve seat for necessary maintenance and cleaning. The compression spring may be mainly lodged within the chamber cap so as to keep the spring in bearing position against the valve ball. The valve ball may be a spherical segment.

Thus the invention may be embodied in a valve insert in combination with a liquid dispensing gun to result in apparatus which provides for immediate response to valve actuating mechanism whether the actuating mechanism be manually or automatically operated. The valving apparatus of the invention may be easily maintained since immediate access to its internal parts is afforded by the chamber cap. These and other advantages of the invention are apparent in the following detailed description and drawing in which:

FIG. 1 is a longitudinal sectional elevation showing in simple form the preferred valving apparatus of the invention;

FIG. 2 is a fragmentary elevation partly in section of the valve of the invention combined with a roller type glue gun;

FIG. 3 is a fragmentary elevation, partly broken away, and showing an alternate embodiment of the invention exemplified by a spot glue gun;

FIG. 4 is a bottom plan view of the dispensing end of the embodiment of FIG. 3; and FIG. 5 is a fragmentary sectional elevation of a dispensing end of an alternate embodiment of the glue gun of FIG. 3.

In FIG. 1 a flow channel 11 having an upstream portion 11A and a downstream portion 11B is contained in a housing member 12. A bore 13 in the housing extends transversely across the flow channel. The bore has a threaded portion 14 at one of its ends. A valve insert element 16 is swaged or press-fitted into bore 13 at an end of the bore opposite threaded portion 14. The insert element has a first chamber 13, a valve seat 19 and a first port 20. The valve seat and chamber are oriented concentrically about a longitudinal passage 21 extending from chamber 18 to the exterior of the insert element and the housing member.

A chamber cap 24 is threaded into the threaded bore portion 14. The chamber cap closes off a portion of the bore 13 and defines a second chamber 26 between inner face 27 of insert element 16 and the inner portion of the chamber cap. A second port 29 connects the second chamber and inlet portion 11A of the flow channel.

A valve ball 31 is movably contained in the second chamber. A compression spring 33 urges the valve ball toward seat 19 on the valve insert 16. The compression spring resides in part within a recess 35 of cap 24. While a compression spring has been shown, other resilient means for urging the ball toward the valve seat may be used.

In practice it has been found desirable to form the valve seat with the valve ball. An insert is fabricated with the corner defined by the juncture of first chamber 18 and surface 27 encompassing a right angle. Then the ball itself is pressed against the seat after the valve is assembled. The pressure modifies the corner to a configuration approximating the spherical contour of the valve ball.

The spring loaded against the valve ball may be countered by means of a valve plunger 37 movable in passage 21 through insert element 16. The plunger has a shank 38 extending exteriorly of the insert and may be engaged by actuating means which may be manual, semiautomatic, or fully automatic. The plunger is retained within the insert element by an enlarged head 39. Preferably the plunger is sized with respect to passage 21 so that .001 inch clearance exists. If this clearance is maintained, no leakage around the plunger occurs. The resistance to liquid flow through the passage is so much greater than the normal flow pattern from first chamber 18 when the valve is open that there is no tendency for liquid flow between the plunger and passage 21.

The valve of the invention as exemplified in FIG. 1 operates as follows:

Flow of liquid in flow channel 11 proceeds from input portion 11A through port 29 into second chamber 26. When the valve ball is in the position shown in FIG. 1 no flow into the first chamber and thence onward in flow channel outlet portion 11B takes place. When plunger 37 is depressed, either manually or by automatic means, valve ball 31 is displaced from the valve seat, opening the flow path into first chamber 18. The liquid then proceeds under pressure from first chamber 18 through first port 20 into portion 11B of flow channel 11. When the desired amount of liquid has been delivered through channel 11B, the actuating pressure on the plunger is withdrawn and spring 33 returns ball 31 into closed position against the valve seat.

FIG. 2 illustrates an embodiment of the invention combining a roller type glue dispensing gun with an insertable valving mechanism. A gun housing 41 has a flow channel 42 into which a line fitting such as coupling 43 is threadably engaged. The coupling may be linked to a liquid supply contained in a pressurized tank. Commercial gluing is conventionally done under these conditions. Flow channel 42 includes a large passage 45 which communicates through a smaller passage 46 and across a transverse bore 47 to a second small passage 46A. Passage 46A leads to a lateral bore 48 which extends parallel to a glue applying roller 49. A multiplicity of controlling veins such as vein 51 of FIG. 2 control the flow of glue and distribute the glue uniformly along the preferably serrated periphery of the roller.

Transverse bore 47 houses a valve insert element 53 having a first chamber 54, a valve seat 55 and a first port 56. The valve seat and first chamber are substantially concentric with a reduced diameter passage 58 extending from first chamber 54 outwardly through insert element 53. A a plunger 59 is movably lodged within reduced diameter passage 58 and has an exterior shank 59A against which an actuating lever 61 bears. The lever pivots about a mounting pin 63 in a spaced pair of flanges like flange 64 extending outwardly from the surface of housing 41. As in the embodiment of FIG. 1, a threaded bore portion 65 receives a threaded chamber cap 66 in which a compression spring 67 is seated. The spring urges a valve ball 68 toward valve seat 55. The spring opposes inward thrust of plunger 59.

In operation of the embodiment of FIG. 2 a downward pressure upon lever 61 thrusts plunger 59 inwardly against valve ball 68 so that the ball is removed from valve seat 55 as illustrated. In this open condition of the valve liquid flows from channel 42 through reduced passage 46 into a second chamber portion 71 of transverse bore 47. From the chamber liquid flows through valve seat 55 and outwardly through port 56 from first chamber 54 and into lateral bore 48 through small passage 46A. From the lateral bore the liquid is distributed to the periphery of roller 49 through the veins 51. When the glue gun of FIG. 2 is rolled across the workpiece, the roller delivers a continuous broad band of adhesive to the surface of the workpiece.

Thus it can be seen from FIG. 2 that the simple valving apparatus shown in FIG. 1 can be readily combined in a glue gun such as that shown in FIG. 2. The glue gun of FIG. 2 is immediately responsive to any positive pressure on the control lever, since only a minimal displacement of the valve ball from the valve seat is needed to open the valve sufficiently for adequate liquid flow.

In FIG. 3 a glue gun housing 75 has a flow channel 76 in which a valve insert element 77 is interposed. Output portion 76A of the flow channel receives a dispensing tip 78 which is of a type conventionally described as a "spot" tip, since it dispenses a shaped spot of glue onto the workpiece it contacts. The tip is tubular, and while shown in FIGS. 3 and 4 as cylindrical, it may have any desired configuration conforming with the required glue spot shape.

Valve insert element 77 is preferably cylindrical in shape and is pressfitted or swaged into a transverse bore 79 which extends across flow channel 76 of the gun housing. The flow channel has a line fitting or coupling 81 which connects the gun to a line (not shown) from a pressurized supply vessel (not shown).

The valve insert element which is interposed across the flow channel has a first chamber 83, a valve seat 84 and a second chamber 85. The chambers and the valve seat are coaxial and substantially concentric to a plunger 86 extending from exteriorly of the gun housing through the housing and a reduced diameter passage 88 into first chamber 83. The plunger thrusts against a valve ball 91 which is urged toward the valve seat by a compression spring 92. A chamber cap 93 threadably engaged within the valve insert element so as to close second chamber 85 also supports the compression spring so that it is always in contact with the valve ball.

A first port 101 connects between first chamber 83 and flow channel portion 76A. Port 101 thereby provides for flow from the first chamber of the valve into dispensing tip 78. A second port 102 connects between flow channel 76 and second chamber 85. Both of the ports are contained within the valve insert element and each lies adjacent the plane of closure of the valve seat and substantially parallel thereto. With ports located in the described fashion, on either side of the valve seat, little turbulence accrues as liquid flows through the valve since the ports lie largely in the same line as the flow path of the liquid through the housing. Additionally there is a very small displacement transverse to the liquid flow because the transverse dimension between the valve seat and each port is small. The movement of the valve ball is also transverse to the main flow line through the housing or gun. The incoming liquid impinges upon the valve ball upon the upstream side of the valve seat so that there is no tendency of the pressure of the liquid to unseat the valve ball to open the valve. Also, the liquid pressure is not directly imposed upon the spring load either positively or negatively, because the flow is not in line with the path of ball movement. Thus the calibration of the closing force is not disturbed by changes in the line pressure.

The embodiment of FIGS. 3 and 4 is shown with a plunger actuated by a solenoid 104. The coil 105 of the solenoid recives current through an electrical lead 106 from a source not shown. An armature 108 is fixed to the exterior shank of plunger 86. When actuated, the solenoid pulls the armature toward the valve ball, thrusting the plunger against the ball and moving the ball from the valve seat. This movement is opposed by the spring 92, and the solenoid must of course be strong enough to overcome the spring. Each time the solenoid is actuated the valve is opened by the displacement of ball 91 from the valve seat.

Liquid flow from first chamber 83 of the valve into the dispensing tip 78 is through inner bore 109 of the tip. The extreme outward end of the dispensing tip has a sloping wall 111 formed by chamfering the edge of the inner bore. The adjacent edge of an end plug 112 in the bore is chamfered to form a slanting surface 113 which combines with wall 111 of the tip to define an annular distributing channel 115 whose configuration is best seen in FIG. 4.

A plurality of controlling veins 116 are incised at regular intervals along the periphery of plug 112 and together with the inner wall of the tip form passages for liquid flow from the tip bore to the distributing channel 115. The size of the veins determines in part the amount of glue which reaches the channel. The channel itself has been found necessary to optimum distribution of glue on the dispensing tip in the proper pattern.

The solenoid may be arranged so that it is actuated each time the dispensing tip is touched by the workpiece to which glue is applied. The unique arrangement of the apparatus of the invention provides a valve whose response is immediate so that glue arrives quickly at the tip channel. The total vein aperture of the tip is such that a static column of glue remains in the tip beyond the closed valve. Therefore glue is immediately available at the tip when the open valve again imposes line pressure on the residual column.

Similar advantages apply to dispensing tip 121 of FIG. 5. The tip of FIG. 5 has a plug 122 similar to plug 112 of FIGS. 3 and 4. However, the plug 122 contains a passage 123 through which a plunger 125 protrudes from the bore of the tip. The plunger may be used to urge a ball from the valve seat to open the valve to liquid flow through the tip to veins 127 of the tip. Since the veins offer less resistance to liquid flow than the passage 123 with the plunger in it, there is no leakage through the passage and the control and distributing function of the veins are not disturbed. The veins conduct the glue to a channel 129 formed by the oppositely sloping edges of the tip and the plug as previously described with respect to the device of FIGS. 3 and 4.

The drawings have illustrated the valve ball as being a complete sphere. Sphere segments are equally feasible for the ball valves, but complete spheres are preferable because of their relative ease of manufacture.

The various illustrative embodiments of the invention have in common the advantages of quick response to actuation of the plunger, a relatively non-turbulent flow of liquid through the valve mechanism and easy access for maintenance to the interior parts of the valve. Additionally the valving parts are easily manufactured by conventional machining techniques and are relatively inexpensive to install within the housing for any flow channel. Many more uses for the valving concept herein exemplified by the glue guns will occur to those skilled in the art.

I claim:
1. In a viscous liquid dispensing device for use with a valved flow housing, the combination comprising a hollow tip, a plug fixed in the tip at the end thereof remote from the housing, a sloping inner wall at the end of the tip containing the plug, a slanting outer surface on the extreme edge of the plug, the inner wall and the outer surface defining a distributing channel at the end of the tip, and a plurality of notches in the periphery of the plug defining in combination with the tip interior a number of conducting veins connecting the tip interior to the distributing channel.

2. A viscous liquid dispensing device for use with a valved flow housing comprising
  a hollow elongate tip securable to the housing discharge,
  a plug fixed in the tip at the end thereof remote from the housing,
    the external tip and plug ends being substantially co-planar,
  a sloping inner wall at the end of the tip containing the plug, a slanting outer surface on the extreme edge of the plug, the inner wall and the outer surface defining a distributing channel at the end of the tip recessed from the plane of the tip end and the plug end, and
  a plurality of notches in the periphery of the plug defining in combination with the tip interior
    a number of liquid conducting veins connecting the tip interior to the distributing channel.

3. A glue dispensing device for applying a spot of glue on a work piece comprising a hollow elongate tip adapted to connect to a source of liquid glue at one end and to discharge that glue at the other end, a plug fixed in said tip substantially coplanar with said discharge end to provide a bottom surface thereon, a glue distributing channel formed in said bottom surface following the periphery of said plug, and a plurality of glue conducting veins disposed axially of said tip on said periphery, said veins connecting said channel with said source of liquid glue.

References Cited in the file of this patent
UNITED STATES PATENTS

| | | |
|---|---|---|
| 762,818 | Garwood | June 14, 1904 |
| 1,517,914 | Macdonald | Dec. 2, 1924 |
| 1,758,119 | Le Moon | May 13, 1930 |